US012748229B2

(12) United States Patent
Osypov et al.

(10) Patent No.: US 12,748,229 B2
(45) Date of Patent: Sep. 29, 2026

(54) LEARNING HYDROCARBON DISTRIBUTION FROM SEISMIC IMAGE

(71) Applicant: Landmark Graphics Corporation, Houston, TX (US)

(72) Inventors: Konstantin Osypov, Houston, TX (US); Fan Jiang, Houston, TX (US); Marcelo Gomes, Houston, TX (US); Satyan Singh, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 150 days.

(21) Appl. No.: 17/896,748

(22) Filed: Aug. 26, 2022

(65) Prior Publication Data

US 2024/0069228 A1 Feb. 29, 2024

(51) Int. Cl.
*G01V 1/30* (2006.01)
*E21B 49/00* (2006.01)
(Continued)

(52) U.S. Cl.
CPC ................ *G01V 1/30* (2013.01); *E21B 49/00* (2013.01); *G01V 1/345* (2013.01); *E21B 41/00* (2013.01);
(Continued)

(58) Field of Classification Search
None
See application file for complete search history.

(56) References Cited

U.S. PATENT DOCUMENTS 11,598,892 B2 * 3/2023 Eckersley .............. G01V 20/00
11,693,139 B2 * 7/2023 Denli ..................... G01V 1/301
702/16

(Continued)

FOREIGN PATENT DOCUMENTS

CA 1219944 A * 3/1987 ............ G01V 1/282

OTHER PUBLICATIONS

Jensen, et al.; "Efficient and flexible characterization of paleokarst seismic signatures using point-spread function-based convolution modeling"; Society of Exploration Geophysicists; SEG International Exposition and 90th Annual Meeting; 2020; 5 pgs.

(Continued)

*Primary Examiner* — Arleen M Vazquez
*Assistant Examiner* — Leonard S Liang
(74) *Attorney, Agent, or Firm* — Michael Jenney; Parker Justiss, P.C.

(57) ABSTRACT

The disclosure relates to determining rock properties of subterranean formations and learning the distribution of hydrocarbons in the formations. A geometrical element spread function is disclosed that quantifies distortion of the geology as seen by the geophysicists who process seismic images of the subterranean formations. A method of determining the rock properties using the seismic images and synthetic images is provided. In one example, the method includes: (1) obtaining seismic data from a subterranean formation using a seismic acquisition system, (2) generating one or more seismic images of the subterranean formation using the seismic data, (3) creating one or more synthetic images from the one or more seismic images, and (4) determining rock properties of the subterranean formation based on the one or more seismic images and the one or more synthetic images.

20 Claims, 9 Drawing Sheets

(51) Int. Cl.

| | |
|---|---|
| ***G01V 1/34*** | (2006.01) |
| *E21B 41/00* | (2006.01) |
| *E21B 43/00* | (2006.01) |
| *E21B 47/002* | (2012.01) |
| *G01V 1/28* | (2006.01) |
| *G01V 20/00* | (2024.01) |

(52) U.S. Cl.

CPC ............. *E21B 43/00* (2013.01); *E21B 47/002* (2020.05); *E21B 47/0025* (2020.05); *E21B 2200/20* (2020.05); *G01V 1/28* (2013.01); *G01V 1/282* (2013.01); *G01V 1/303* (2013.01); *G01V 1/306* (2013.01); *G01V 20/00* (2024.01); *G01V 2210/60* (2013.01); *G01V 2210/614* (2013.01); *G01V 2210/74* (2013.01)

(56) References Cited

U.S. PATENT DOCUMENTS

| | | | | |
|---|---|---|---|---|
| 2005/0251340 | A1* | 11/2005 | Tompkins | G01V 3/083 702/2 |
| 2006/0072373 | A1* | 4/2006 | Lee | G01V 1/28 367/51 |
| 2014/0226437 | A1* | 8/2014 | Chambers | G01V 1/30 367/7 |
| 2014/0301162 | A1* | 10/2014 | Mensch | G01V 1/003 367/15 |
| 2017/0192118 | A1* | 7/2017 | Du | G01V 1/282 |
| 2017/0219729 | A1 | 8/2017 | Yan et al. | |
| 2018/0024261 | A1 | 1/2018 | Madof | |
| 2019/0331812 | A1* | 10/2019 | Liu | G01V 20/00 |
| 2019/0383965 | A1* | 12/2019 | Salman | G01V 3/18 |
| 2020/0158898 | A1* | 5/2020 | Le Guern | G01V 1/345 |
| 2020/0183031 | A1* | 6/2020 | Denli | G01V 1/282 |
| 2020/0183047 | A1* | 6/2020 | Denli | G01V 20/00 |
| 2020/0265615 | A1 | 8/2020 | Di Santo et al. | |
| 2020/0301036 | A1 | 9/2020 | Ramfjord et al. | |
| 2021/0116598 | A1 | 4/2021 | Thorne et al. | |
| 2021/0173109 | A1* | 6/2021 | Li | G01V 1/282 |
| 2021/0255346 | A1* | 8/2021 | Sun | G01V 20/00 |
| 2021/0262329 | A1* | 8/2021 | Kaur | G06N 3/0464 |

OTHER PUBLICATIONS

Shabelansky, et al.; "Enhancing seismic imaging resolution by Interpretation-Driven Data Decomposition (IDDD)"; SEG International Exposition and 88th Annual Meeting; 2018; 5 pgs.

Jensen, et al.; "Point-spread function convolution to simulate prestack depth migrated images: A validation study"; Geophysical Prospecting; 2021; 20 pgs.

Jensen, et al.; "Paleokarst reservoirs: Efficient and flexible characterization using point-spread-function-based convolution modeling"; Technical Papers; Interpretatien; May 2021; 17 pgs.

* cited by examiner

LEARNING HYDROCARBON DISTRIBUTION FROM SEISMIC IMAGE

TECHNICAL FIELD

This application relates to, in general, determining rock properties of subterranean formations and, more specifically, to using seismic images for determining the rock properties.

BACKGROUND

Oil and gas companies often use seismology for subterranean exploration. Seismology exploration includes generating seismic waves to map subsurface structures. The seismic waves propagate from one or more sources into the earth and reflect from boundaries between subsurface structures. Receivers detect and record the reflected seismic waves, which can be saved as datasets, or simply seismic data. A seismic interpretation workflow is often used to process the seismic data.

A fundamental step in the seismic interpretation workflow is tying the seismic data measured in time to well log data from subsurface measurements obtained at certain depths of a well. The interpretive ambiguities of seismic-well-tie, however, often prevents the correct interpretation of a seismic image as bandlimited reflectivity. For example, due to the unavoidable presence of multiples and anelastic attenuation in subsurface geology, a traditional 1-D time domain seismic wavelet is typically not sufficient to estimate the reflectivity from the seismic data. Additionally, using the common 1-D time domain seismic wavelet can cause a loss in the resolution. Furthermore, commonly used 1D time-domain convolutional-model assumptions, such as sparsity assumptions, breaks down for varying angles between a well and geologic horizon.

SUMMARY

In one aspect, the disclosure provides a method of determining rock properties of a subterranean formation. In one example, the method includes: (1) obtaining seismic data from a subterranean formation using a seismic acquisition system, (2) generating one or more seismic images of the subterranean formation using the seismic data, (3) creating one or more synthetic images from the one or more seismic images, and (4) determining rock properties of the subterranean formation based on the one or more seismic images and the one or more synthetic images.

In another aspect, the disclosure provides a computing system for estimating rock properties of a subterranean formation. In one example, the computing system includes: (1) an interface to receive seismic data from a subterranean formation and obtained by a seismic acquisition system, and (2) one or more processors to perform operations including generating one or more seismic images of the subterranean formation using the seismic data, creating one or more synthetic images from the one or more seismic images, and determining rock properties of the subterranean formation based on the one or more seismic images and the one or more synthetic images.

In yet another aspect the disclosure provides a computer program product having a series of operating instructions stored on a non-transitory computer-readable medium that directs one or more processors when executed thereby to perform operations to determine rock properties of a subterranean formation. In one example, the operations include: (1) generating one or more seismic images of the subterranean formation using seismic data, (2) creating one or more synthetic images from the one or more seismic images, and (3) determining rock properties of the subterranean formation based on the one or more seismic images and the one or more synthetic images.

BRIEF DESCRIPTION

Reference is now made to the following descriptions taken in conjunction with the accompanying drawings, in which.

DETAILED DESCRIPTION

Figure 1:
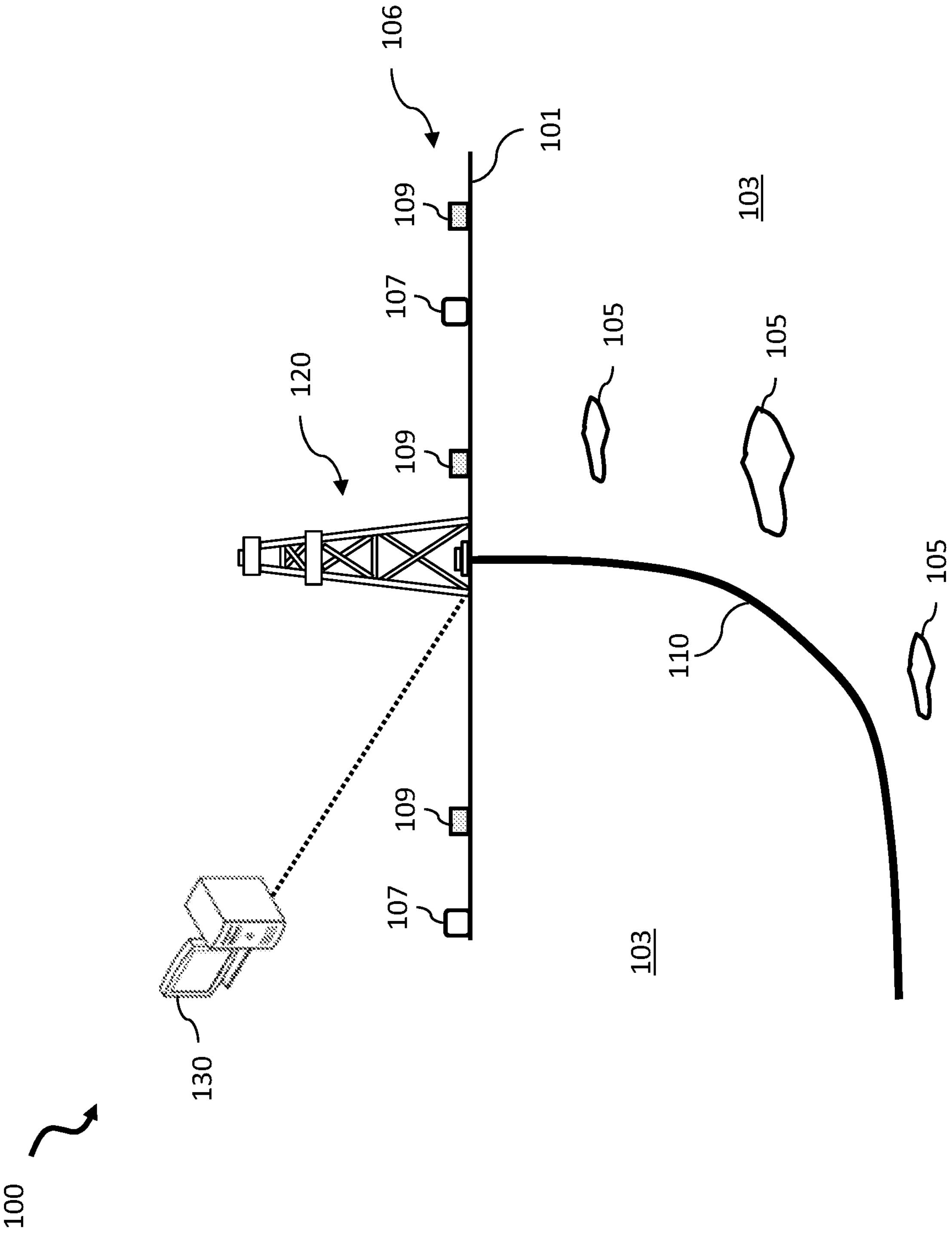
FIG. 1 illustrates a diagram of an example well system including components constructed according to the principles of the disclosure.

The disclosure provides novel seismic-well-tie and seismic inversion workflows using a geometrical element spread function. The geometrical element spread function quantifies distortion of the geology as seen by the geophysicists who process the seismic images. As such, the geometrical element spread function can be a bridge between the geophysicists and the geologist who interpret the seismic data. Using the geometrical element spread function can contribute to improving the horizontal seismic resolution by determining an opening angle and a vertical resolution while considering a seismic dipping reflector. The innovation of the geometrical element spread function serves as a bridge from zero angle/offset to a finite angle/offset that controls the seismic imaging resolution. The geometrical element spread function can be considered as an extended version of Point-Spread-Function (PSF).

The geometrical element spread function can be created by introducing perturbation to the elastic parameters with respect to a geometrical element, then performing 2D/3D demigration followed by 2D/3D reverse time migration (RTM) to create image-based geometrical element spread function. An example for performing demigration is provided by Seismic Modeling by Demigration, Santos et al, Geophysics, 65 (4), 1281-1289, 2000, which is included herein by reference. Advantageously, each spread function can be filtered along a deviated wellbore by Radon Transformation to better represent incident angle of the seismic response along the deviated wellbore for the tie with the wellbore logging data. As such, the geometrical element spread function can be especially beneficial with a deviated well tie. The geometrical element spread function can be used as a 2D/3D convolutional kernel to convolve with seismic reflectivity to generate synthetic seismic data in the depth domain. The synthetic seismic data, or simply synthetic data, can then be compared and matched with well log data via seismic inversion of a seismic interpretation workflow. The seismic inversion can include generating latent space representation by an invertible neural network, and then creating a posterior sampling of full bandwidth acoustic and elastic impedance representation to assist on reservoir model evaluation.

The geometrical element spread function can be used as a seismic inversion kernel for either post-stack or pre-stack data. For post-stack seismic data, the seismic inversion can be similar to using time-domain wavelets. For pre-stack seismic data, the kernel can be used to analyze elastic properties similar to using time-domain wavelets in Amplitude-Variation-with-Offset (AVO) or Amplitude-Variation-with-Angle (VA) elastic inversion.

Geometrical elements serve as elementary models that are interpreted from seismic data and provide a hypothesis of a hydrocarbon location in a subterranean formation. Geometrical elements are represented in seismic images and are defined by multiple distinct points. The geometrical elements can be identified from a dip field generated from the seismic image. A geometrical element can be a line in two dimensions that is defined by two distinct points. In three dimensions, a geometrical element can also be a plane that is defined by at least three distinct points. Each geometrical element identified from one or more seismic images corresponds to a geological element within subterranean formations that represents a change in rock properties. The disclosure advantageously uses physics, such as the elastic properties, to interpret a seismic image to distinguish and classify the geometrical elements as a hydrocarbon location or not.

FIG. 1 illustrates a diagram of an example of a well system 100 constructed according to the principles of the disclosure. The well system 100 is part of a hydrocarbon reservoir that includes one or more types of hydrocarbons, such as oil or gas, located below surface 101 in subterranean formation 103. The surface 101 can be land as shown in FIG. 1 or can be a seabed. Additionally, the surface 101 can represent a water surface or proximate a water surface, such as one to three meters below the water surface. A reservoir model is created to provide an understanding of the subterranean formation 103, which can result in locating the hydrocarbons and assist in performing well operations, such as well placement, updating a geological model, updating a well plan that can be used for drilling wells in the hydrocarbon reservoir to retrieve hydrocarbons, drilling of wells, and production planning. The reservoir model is constructed based on seismic data and field measurements, such as well log data, wherein a seismic interpretation workflow is used to process the seismic data and tie the seismic data to the well log data. The seismic data is collected by a seismic acquisition system 106 having at least one seismic source that sends seismic waves into the subterranean formation 103 and one or more receivers that capture the reflection of the seismic waves from different geological elements of the subterranean formation 103. Examples of sources 107 and receivers 109 of the seismic acquisition system 106 are shown in FIG. 1. Examples of various geological elements of the subterranean formation 103 corresponding to potential hydrocarbon locations are denoted in FIG. 1 by element number 105. The well system 100 includes wellbore 110, surface equipment 120, and computing system 130, which are also illustrated in FIG. 1.

Well log data is collected from the wellbore 110 and is used with the seismic data to create a reservoir model. The well log data can be collected from the wellbore using wireline measurements, logging while drilling (LWD) measurements, (MWD) measurements, or a combination thereof. The wellbore 110 can be an offset well and additional offset wells can be drilled in the hydrocarbon reservoir to obtain additional well log data. The surface equipment 120 represents conventional equipment that can be used to drill the wellbore 110 and obtain the well log data.

The computing system 130 is configured to determine the distribution of hydrocarbons in the subterranean formation 103 and direct well operations for the hydrocarbon reservoir based thereon. The hydrocarbon distribution corresponds to rock properties determined by the computing system 130 based on a seismic image generated from the seismic data and at least one synthetic image generated from the seismic image. The synthetic image simulates the response of the geometrical elements to synthetic elastic waves. A synthetic acquisition system used for the simulation corresponds to at least a subset of the seismic acquisition system 106 used to obtain the seismic data. The computing system 130 can use a seismic interpretation workflow, using the seismic and synthetic images, to generate or update a reservoir model that represents the rock properties. The computing system 130 can include one or more processors to perform at least some of the operations according to the methods disclosed herein, such as methods 200, 300, 400, 500, and 700, to determine the hydrocarbon distribution in the subterranean formation 103. The computing system 130 can be, for example, the computing system of FIG. 9.

Figure 2:
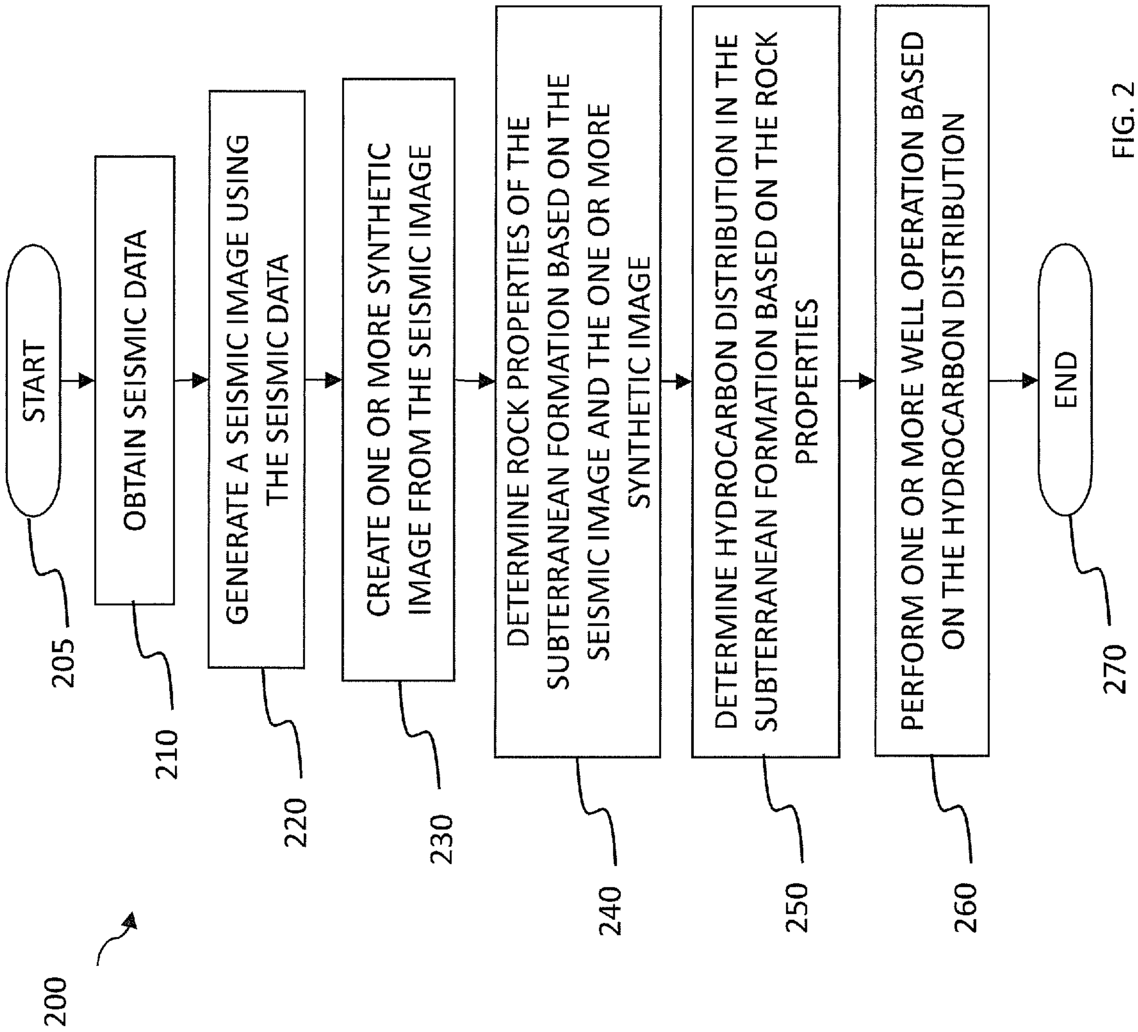
FIG. 2 illustrates a flow diagram of an example of a method of performing a well operation using rock properties of a subterranean formation determined according to the principles of the disclosure.

FIG. 2 illustrates a flow diagram of an example of a method 200 of performing a well operation using rock properties of a subterranean formation determined according to the principles of the disclosure. The subterranean formation can be, for example, the subterranean formation 103 of FIG. 1. At least a portion of the method 200 can be performed by a computing system, such as computing system 130 of FIG. 1. The method begins in step 205.

Figure 7:
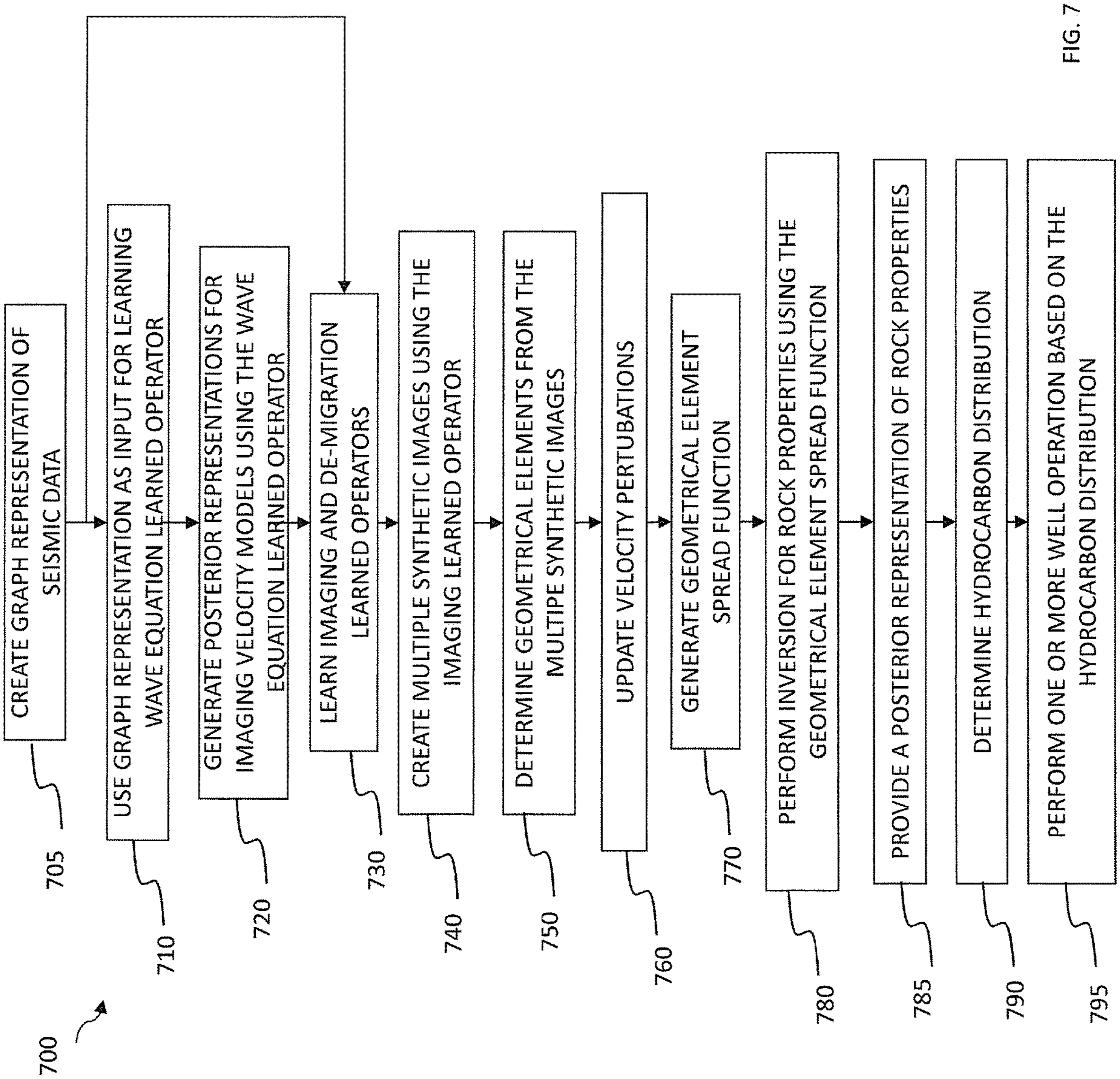
FIG. 7 illustrates a flow diagram of an example method of determining rock properties of a subterranean formation carried out according to the principles of the disclosure.

In step 210, seismic data is obtained. The seismic data can be obtained using a conventional seismic data acquisition system such as discussed in FIG. 1. The seismic data is typically raw data in the time domain that represents the reflection of seismic waves from geometrical elements in the subterranean formation. The seismic data can be processed and presented in different formats. For example, the seismic data can be represented by a graph. FIG. 7 illustrates a flow diagram of an example method of using a graph representation of seismic data.

In step 220, a seismic image is generated using the seismic data. The seismic image can be generated from the seismic data using conventional methods common in the industry that convert the seismic data to coordinates, such as Cartesian coordinates, corresponding to the earth. The seismic image can be proximate a wellbore that is in the subterranean formation. For example, the seismic image can be proximate wellbore 110 in FIG. 1.

The reflectivity of subterranean formations is a very complex response, which can make it difficult to locate hydrocarbons. Additionally, there is an ambiguity in the time to depth transformation that results in uncertainties, such as an uncertainty of the coordinates of hydrocarbons. Accordingly, there is a need to reduce the uncertainty of locating hydrocarbons and increase the confidence to drill wells. As such, the following steps of method 200 address removing or at least reducing uncertainties associated with the positioning of the hydrocarbons in the subterranean formation.

At least one synthetic image is created from the seismic image in step 230. The synthetic image is used as a bridge between the seismic image and determining rock properties. Creating a synthetic image includes updating perturbations of geometrical elements from the seismic image by propagating beams of synthetic elastic waves between a synthetic acquisition system and the geometrical elements. The reaction of the geometrical elements to the synthetic elastic waves is represented using a geometrical element spread function, which quantifies distortion of the geology represented by the seismic image. Seismic images at different incidence angles with respect to the geometrical elements can be used and more than one synthetic image can be created from the one or more seismic images. Generating one or more synthetic images can include a posterior sampling of seismic imaging properties. Geoscience knowledge, a learning operator, or both can be used for creating the one or more synthetic images. Method 700 provides an example of creating multiple synthetic images.

In step 240, rock properties of the subterranean formation are determined based on the seismic image and the one or more synthetic images. Determining the rock properties includes performing a seismic inversion process by tying the seismic data to well log data obtained from the wellbore using the geometrical element spread function. The well-tying is performed in the depth domain, which can reduce uncertainties associated with the rock properties. An invertible neural network can be applied to address uncertainty estimates by analyzing the seismic data distribution in latent space.

Hydrocarbon distribution in the subterranean formation is determined in step 250 based on the rock properties. The rock properties can be presented in a reservoir model, such as for the hydrocarbon reserve of FIG. 1, which represents the hydrocarbon distribution. The hydrocarbon distribution can be used to update a knowledge learning system that can be used for converting one or more seismic images to one or more synthetic images. For example, the hydrocarbon distribution can be used in step 220 instead of the seismic data to generate seismic images. Ask such, method 200 can be an iterative method that uses the hydrocarbon distribution to improve the creation of the one or more synthetic images. The iterations can continue until an acceptable misfit is reached between the synthetic data and the seismic data. Using the hydrocarbon distributions for generating the seismic image provides validation of the reservoir model and can be used to update a knowledge database of the knowledge learning system. The knowledge learning system is a machine learning system including, for example, a reinforcement learning system, a knowledge graph learning system, and transformer neural networks.

In step 260, one or more well operations are performed based on the hydrocarbon distribution. As such, the one or more well operations can be performed based on the rock properties determined using the seismic image and the synthetic image. A well operation can be, for example, updating or creating a reservoir model, determining well placements, updating a well plan, drilling wells, and production planning. The method 200 continues to step 270 and ends.

Figure 3:
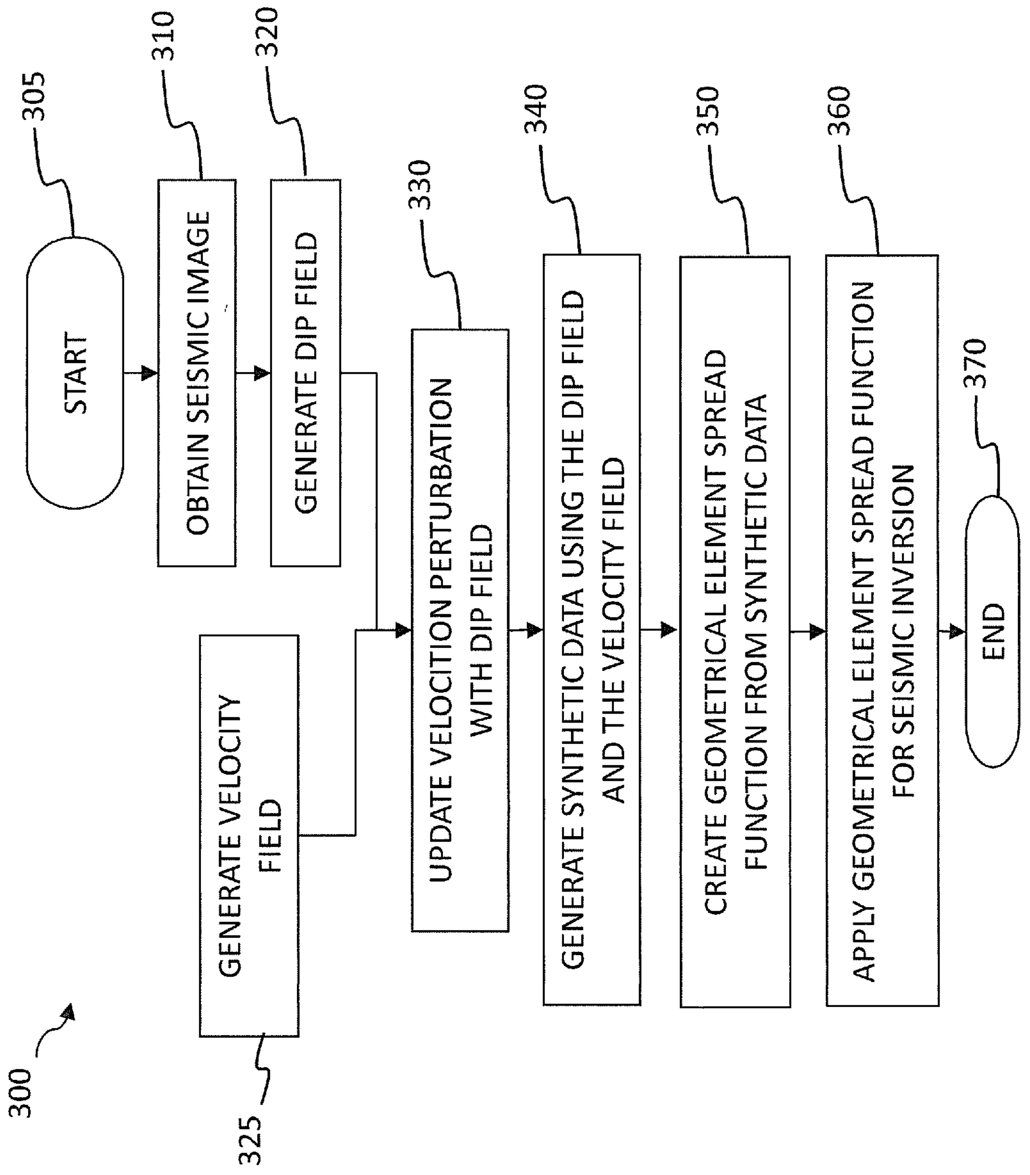
FIG. 3 illustrates a flow diagram of an example method of generating a geometrical element spread function and using the geometrical element spread function for seismic inversion according to the principles of the disclosure.

FIG. 3 illustrates a flow diagram of an example method 300 of generating a geometrical element spread function and using the geometrical element spread function for seismic inversion according to the principles of the disclosure. The method 300 starts in step 305.

In step 310, a seismic image is obtained. The seismic image is generated from seismic data, such as in step 220 of method 200. The seismic image can, for example, correspond to a hydrocarbon field or correspond to an area or volume proximate a wellbore.

In step 320 a dip field is generated from the seismic image. The dip field can be generated using a method commonly used in the industry. From the dip field, geometrical elements can be identified. A physics principle or principles for modelling rock properties using the geometrical elements can be defined. Examples of the physics principles include acoustic impedance jump across a line in 2D and a plane in 3D, AVO/AVA, tuning, and 3D elastic scattering. The geometrical elements can be determined manually by, for example, a geologist, or can be determined from a computing system, such as computing system 130 of FIG. 1. A machine learning interpretation can be used to determine the geometrical elements from one or more seismic images such as noted in step 750 of method 700.

A velocity field is generated in step 325. The velocity field is generated from well log data, such as from an acoustic impedance log. The velocity field can be generated using a method or procedure commonly used in the industry. Elastic parameters corresponding to elastic waves can be obtained from the velocity field.

In step 330, a velocity perturbation field is updated with the dip field. Here geometrical elements identified from the dip field are placed in a velocity perturbation field and velocity perturbations and thickness between geological layers are estimated using the geometrical elements. Detuning by machine learning of spectral responses can be used for validation of the perturbation model.

Synthetic data is generated in step 340 using the dip field and the velocity perturbation field. Beams of elastic waves are synthetically propagated introducing perturbation to the elastic parameters with respect to the geometrical elements. The synthetic data simulates the response of the earth to seismic waves. Physics principles to propagate the synthetic waves can be defined. Examples of such physics principles are provided in step 760 of FIG. 7. Synthetic prestack-seismic data from a physics-based neural network can be used with demigration and remigration for reservoir model evaluation.

In step 350, geometrical element spread function is created from the synthetic data. The synthetic data is imaged back to create the geometrical element spread function. A migration can be performed to obtain an image for velocity perturbation of the geometrical elements. Instead of a line or plane in the dip field, a distortion is shown at the geometrical elements wherein the distortion is quantified by the geometrical element spread function. For example, a 2D/3D demigration followed by 2D/3D reverse time migration can be used to create an image-based geometrical element spread function. The geometrical element spread function can be used as a 2D/3D convolutional kernel to convolve with seismic reflectivity to generate synthetic seismic data in the depth domain. The geometrical element spread function can be applied as a geometrical element to a physics-based unsupervised seismic inversion with an acoustic propagator.

In such instances, the geometrical element spread function can be used as an analogue (replacement) to a time-domain wavelet, to perform depth domain convolution for inversion.

The geometrical element spread function is applied in step 360 for seismic inversion. The geometrical element spread function can be used for well-tie in depth domain. As previously noted, ambiguity and uncertainty exists in conventional well-ties regarding the positioning of the geometrical elements in absolute XYZ coordinates. Well-tie provides a ground truth check using the well log data that provides a ground truth of the geology of the subterranean formation. The well-tie is used for the seismic inversion to produce, for example, a reservoir model of rock properties. Method 300 can be used to validate a reservoir. After step 360, method 300 continues to step 370 and ends.

Figure 4:
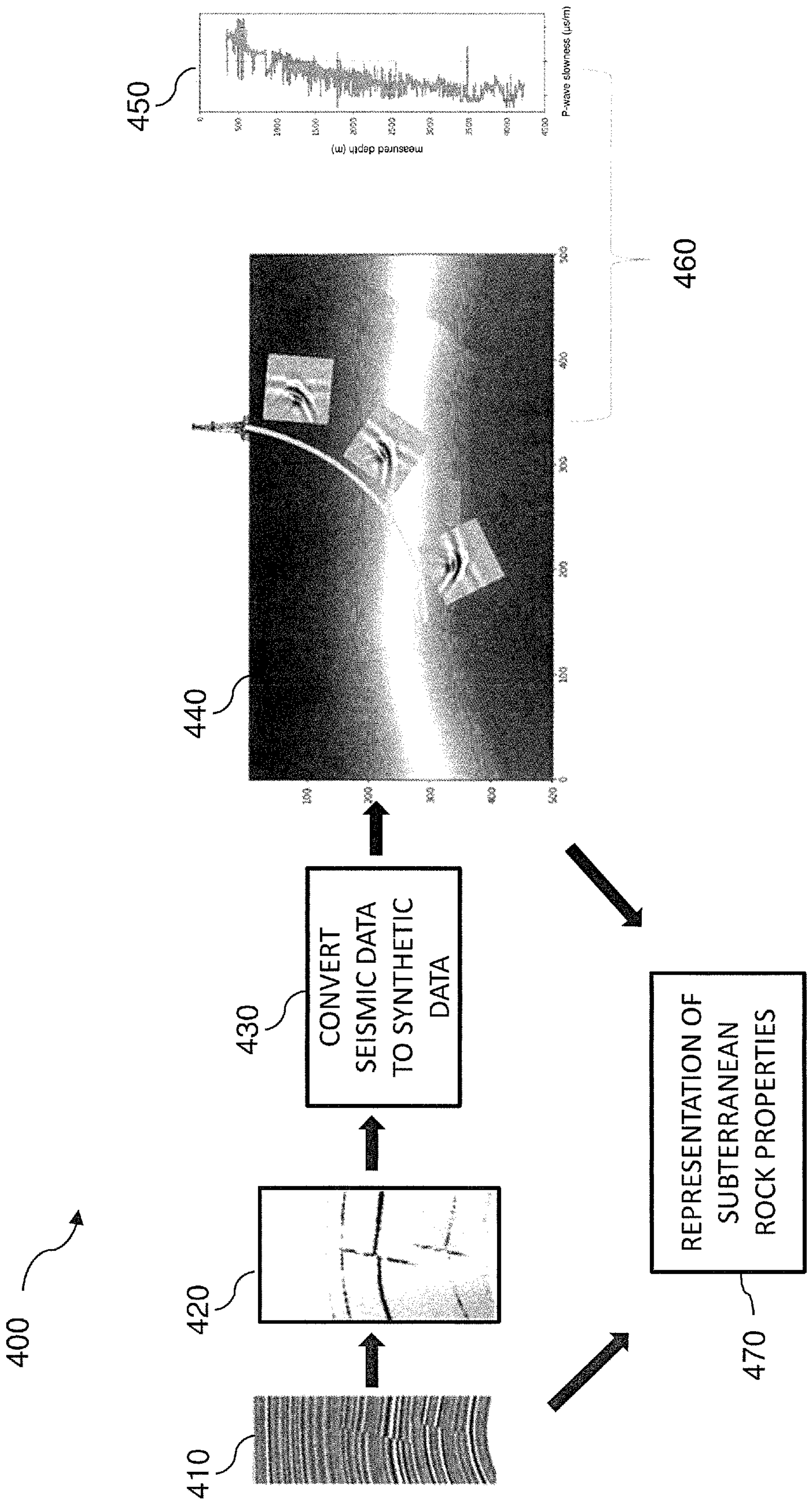
FIG. 4 illustrates a pictorial flow diagram of an example inversion workflow using well log data according to the principles of the disclosure.

FIG. 4 illustrates a pictorial flow diagram of an example inversion workflow 400 using well log data according to the principles of the disclosure. At least some of the steps of the inversion workflow 400 correspond to method 300. In step 410, a seismic image is obtained. The seismic image can correspond to an area around a wellbore, such as around wellbore 110, or represent a greater area or volume, such as the hydrocarbon field represented in FIG. 1. The seismic image can be generated according to step 220 of method 200 in FIG. 2. In step 420, a dip field is generated from the seismic image. The dip field can be generated according to step 320 of method 200 in FIG. 3. In step 430 a synthetic image is generated from the seismic image. To create the synthetic image, synthetic data can be generated by propagating synthetic beams of elastic waves. The synthetic data is then used to create a synthetic image that represents the distortion of the synthetic beams of elastic waves at geometrical elements using the geometrical element spread function. The synthetic image can also be created by demigrating the seismic image using a velocity model and then migrating, such as RTM, the resulting seismic data to create the synthetic image. As such, a demigration/migration combination can be used to create the synthetic image. Block 440 illustrates an example synthetic image showing geometrical element spread functions that correspond to the geological elements 105 of FIG. 1. In step 450, well log data is obtained from a wellbore. The image of step 450 represents well log data that is collected from a wellbore, such as the deviated wellbore 110 of FIG. 1 represented in block 440. The example well log data includes density and velocity measurements obtained from the wellbore.

Figure 5:
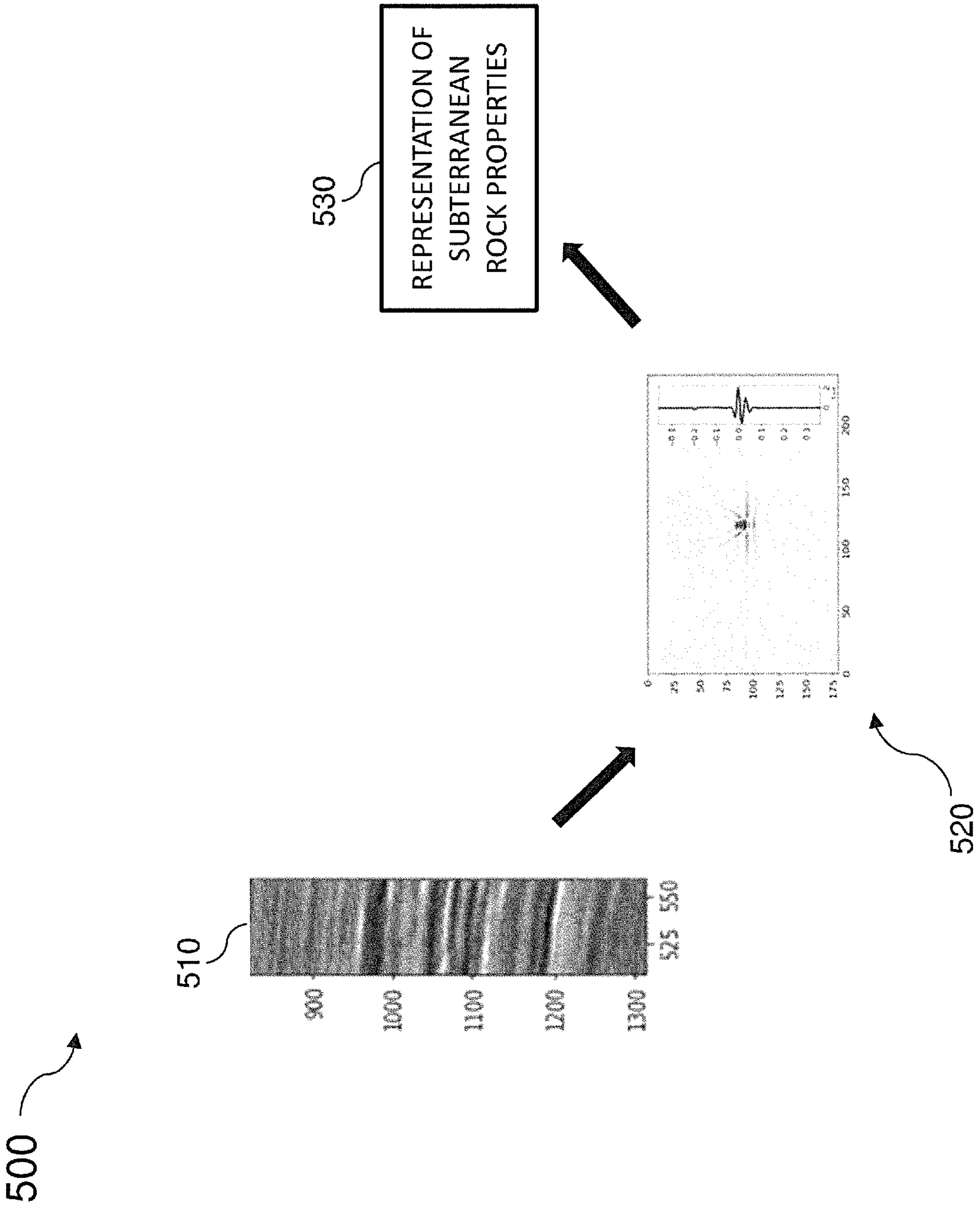
FIG. 5 illustrates a pictorial flow diagram of an example of an inversion work flow without using well log data according to the principles of the disclosure.

In step 460, a well-tie is performed using the synthetic image of step 440 and the well log data of step 450. The well log data provides a ground truth of the geology of the subterranean formation and the geometrical element spread function can be used for the well-tie in depth domain. In step 470, a seismic inversion is performed using the seismic image of step 410 and the synthetic image of step 440. The result of step 470 is a representation of rock properties of the subterranean formation. The representation can be a seismic inversion of elastic rock properties FIG. 5 illustrates a flow diagram of an example of a method 500 of determining rock properties of a subterranean formation without using well log data according to the principles of the disclosure. The method 500 can be used when well log data is not available, such as before offset or exploratory wells are drilled in a subterranean formation of a reservoir. As such, the method 500 generates a representation of rock properties using seismic and synthetic data. Some of the steps of the method 500 may correspond to steps of the methods or workflows of FIGS. 2, 3, and 4 discussed above. In step 510, a seismic image is obtained. The seismic image can be generated from seismic data obtained from a hydrocarbon reservoir, such as in step 220 of FIG. 2.

A synthetic image is created in step 520 from the seismic image. The synthetic image can be created, for example, using a combination of demigration and migration as discussed with respect to step 430 of FIG. 4. In another example, the synthetic image can be created based on the propagation of synthetic waves as also discussed with respect to step 430 of FIG. 4. The synthetic image includes a geometrical element spread function such as created in step 350 of FIG. 3

In step 530, rock properties of the subterranean formation are determined using the synthetic image. The rock properties can be represented by an image, such as by a reservoir model. The image can be an inverted reservoir model, wherein the physics from the geometrical element spread function are used to guide the inversion process.

Figure 6:
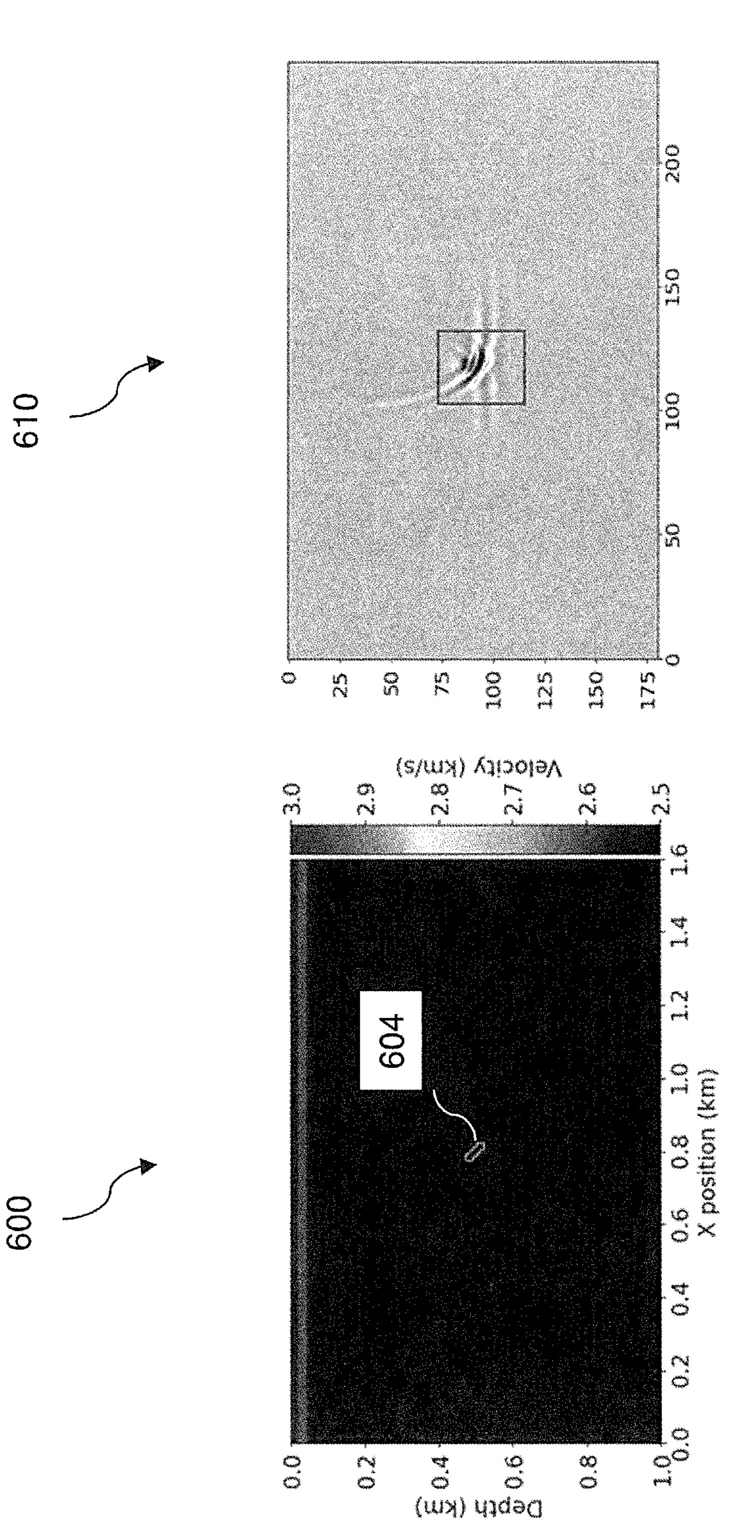
FIG. 6 illustrates examples of a velocity model with a geometrical element as a reflector and a corresponding image-based geometrical element spread function created by RTM.

FIG. 6 illustrates examples of a velocity model 600 with a geometrical element as a reflector and a corresponding image-based geometrical element spread function 610 created by RTM. In typical velocity models a single point is used to perturb. However, a majority of the physics used in inversion for rock properties is based on planes and lines, which is represented by the geometrical element 604 of velocity model 610. Using the geometrical elements as disclosed herein for velocity perturbations more closely aligns with the physics used for the inversion process of rock properties compared to using single points.

FIG. 7 illustrates a flow diagram of an example method 700 of determining rock properties of a subterranean formation carried out according to the principles of the disclosure. One or more of the steps can apply one or more learning operators for performing a particular action or function. A learning operator is developed by examining a particular process and preserving the mapping of the particular process from the initial product to the end product or result. For example, a learning operator can be developed when generating a seismic image from seismic data and then used later for generating another seismic image from seismic data. Accordingly, a learned operator for a process can then be used for similar process. The method 700 includes examples of particular learned operators that can be used when determining rock properties.

In method 700, seismic data is obtained, such as in step 210 of FIG. 2, processed, and represented as a graph. Method 700 begins in step 705 with creating a graph representation of the seismic data.

In step 710, a wave equation learned operator is learned using the graph representation as an input. The wave equation learned operator represents mapping from the seismic data to a low frequency velocity model. The wave equation learned operator can capture the physical constrained response compared to standard machine learning. The wave equation learned operator can be a continuous operator (nature) and provide a natural representation based on principles of physics. In step 720 posterior representations for imaging velocity models are generated using the wave equation learned operator. The velocity models can be low frequency velocity models.

An imaging learned operator and a demigration learned operator are learned in step 730 from the graph representation created in step 705 and the posterior representations of the velocity models of step 720.

In step 740 multiple synthetic images are created using the imaging learned operator. Demigration can be performed on the velocity model and the imaging learned operator can then be used to create the multiple synthetic images, for example, an ensemble of synthetic images.

From the multiple synthetic images, geometrical elements can be determined in step 750. The geometrical elements, which can include 2D lines and 3D planes, can be determined from the multiple synthetic images using machine learning and defined for interpreting the synthetic images. Physics principle(s) can be defined for determining the geometrical elements and modelling rock properties. As noted above regarding step 320 of FIG. 3, the physics principles can include at least one of acoustic impedance jump across a line in 2D and a plane in 3D, AVO/AVA, tuning, and elastic scattering.

In step 760, velocity perturbations are updated with respect to the geometrical elements. The geometrical elements can be placed in a velocity perturbation field and velocity perturbations and thickness between geological layers are estimated using the geometrical elements. Detuning by machine learning of spectral responses can be used for enhancing resolution of inversion for rock properties.

For updating of the velocity perturbations, beams of elastic waves can be synthetically propagated introducing perturbation to the elastic parameters with respect to the geometrical elements. Physics principles to propagate the synthetic waves can be defined. The physics principles can include at least one of acoustic wave equation in isotropic and anisotropic media, elastic wave equation in isotropic and anisotropic media, and pseudo-elastic wave equation in vertical transverse isotropy (VTI) and tilted transverse isotropy (TTI) media. A physics-guided neural operator for forward modeling can be used for the synthetic wave propagation.

Figure 8:
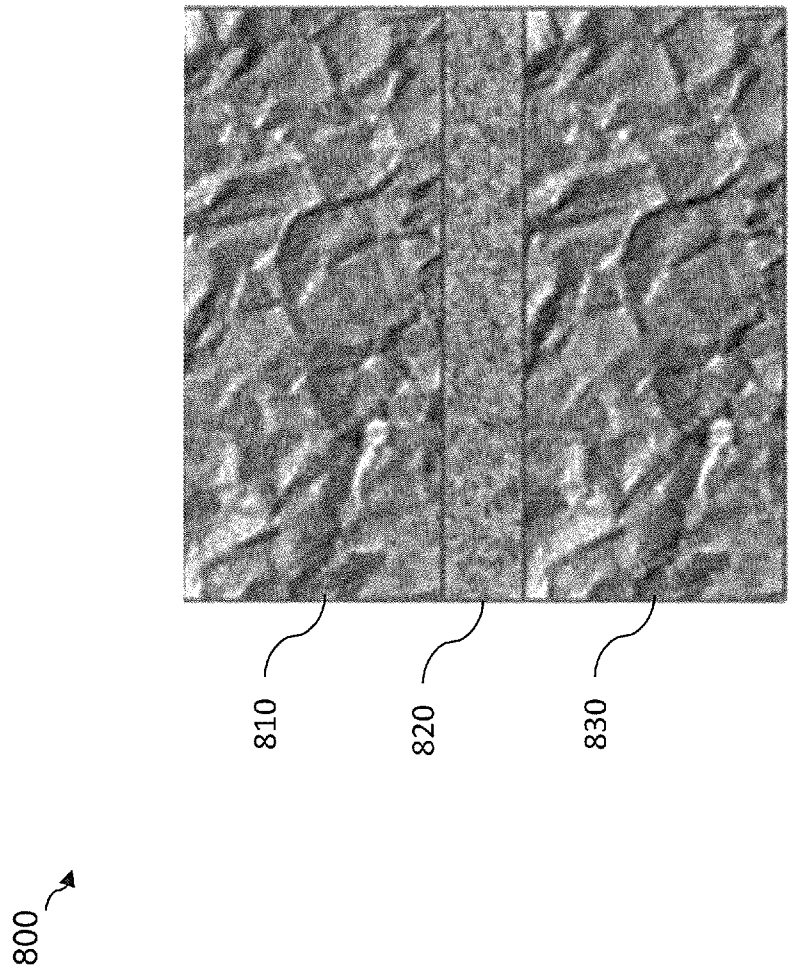
FIG. 8 illustrates a subterranean model having three layers, which can be used to update velocity perturbations according to the principles of the disclosure.

A 3-layer model such as shown in FIG. 8, can be used to perform spectral decomposition as metrics for validation of the velocity perturbations. FIG. 8 illustrates a subterranean model 800 having three layers 810, 820, 830. Various parameters can be established for evaluation and calculation. In this example, ten parameters are used. For each of the layers 810, 820, 830, P-wave velocity, S-wave velocity and density are assigned. Additionally, a thickness of the middle layer 820 is designed and changed to measure the spectral response with different thicknesses. Markov Chain Monte Carlo (MCMC) for posterior sampling and various evaluation metrics, such as loss function, can be used for comparison between synthetic data and real seismic data.

Method 700 continues to step 770 wherein a geometrical element spread function is generated using the imaging and demigration learned operators for updated velocity perturbations.

In step 780, the geometrical element spread function is used to perform inversion for rock properties. An invertible neural network for normalizing workflow can be used in the inversion step 780. A posterior representation of the rock properties is provided in step 785 based on the inversion. The inversion performed in step 780 can be done for elastic properties. As such, the posterior representation can be, for example, a representation of elastic properties. The posterior representation can be a machine-learned representation and can represent full-bandwidth elastic impedance.

Geoscience knowledge can also be used for generating the posterior representation of hydrocarbon spatial distribution. For example, information can be extracted from a knowledge database of well and subterranean data using an algorithm, such as a natural language processing (NLP) algorithm. The extracted information can be geophysical information, such as velocity and density, which can be analyzed and used with respect to AVO classifications. The AVO classifications can be used to guide seismic inversion and hydrocarbon detection and fluid parameter analysis. The knowledge database can be a proprietary or public database of historical data.

The geophysical information extracted from the knowledge database or databases can be used to create multiple synthetic images from seismic data. For example, the geometrical element spread function of step 770 can be applied to the reflectivity impedance to generate normal incidence spread function, and then also used to calculate the spread function angle gather when having a different incidence angle. The normal incidence spread function can be combined with the AVO classification knowledge and the related response from the angle gatherer for elastic pre-stack seismic inversion and further hydrocarbon detection and lithology identification. Accordingly, multiple synthetic images at different angles or offsets can be used for elastic inversion. The multiple synthetic images at different angles or offsets can also be used for deviated well adapting by creating images along the deviated well.

In step 790, hydrocarbon distribution is determined based on the rock properties. For example, the hydrocarbon distribution can be based on the elastic properties. Statistical analysis and machine learning can be used to determine the relationship between the rock properties and hydrocarbon distribution(s) in the subterranean formation. For example, random forest ensemble, gradient-boost ensemble, or XGBoost ensemble can be applied to evaluate the importance relationship between the rock properties and hydrocarbon distribution. Statistical factors, e.g., reserves, recovery factor, connectivity, can then be applied to evaluate the prediction result from the evaluation.

An ensemble of reservoir models can be generated using the hydrocarbon distribution. Additionally, the uncertainty of reservoir parameter(s) given the hydrocarbon distribution(s) can be assessed. For example, a bootstrap model or Deep Gaussian Mixture model can be applied to evaluate the uncertainty in order to quantify the accuracy.

In step 795, one or more well operations is performed based on the hydrocarbon distribution. The well operations can include reservoir operations, such as drilling decisions, and economical analysis of the reservoir operations. The drilling decisions can include optimizing one or more well trajectory computations or other well field operations. Additionally, decisions on capital projects, investing, and economic models can be made based on the hydrocarbon distribution.

Figure 9:
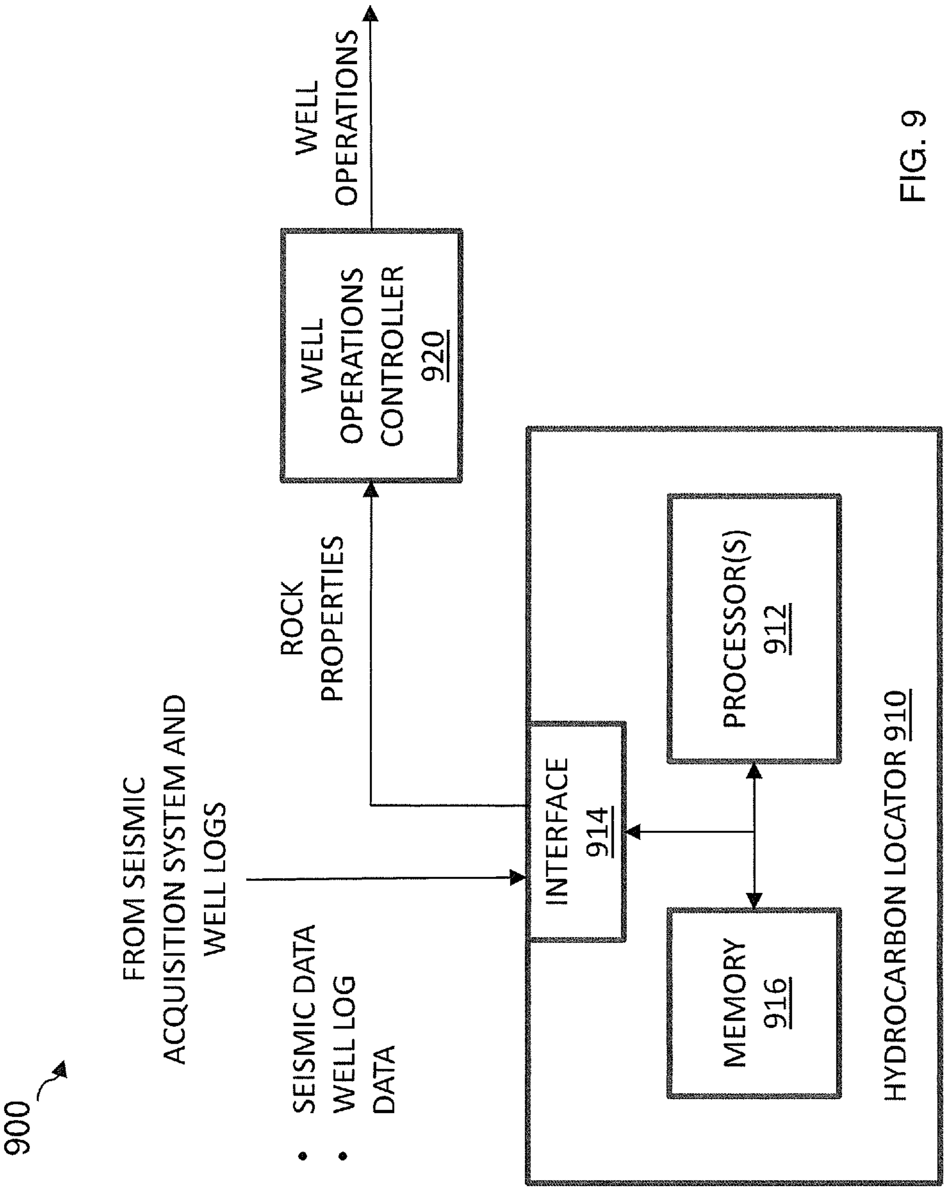
FIG. 9 illustrates a block diagram of an example of a computing system for directing well operations according to the principles of the disclosure

FIG. 9 illustrates a block diagram of an example of a computing system 900 for directing well operations according to the principles of the disclosure. The computing system 900 is configured to determine hydrocarbon distribution in a subterranean formation and based thereon direct, initiate, or control a well operation. The computing system 900 can be a distributed system wherein the functional logic is distributed across multiple computing devices. The computing devices can be servers located in data centers or corporate offices. At least a part of the computing system 900 can be cloud-based. The computing system 900 includes a hydrocarbon locator (HL) 910 and a well operations controller 920.

The HL 910 includes one or more processors, represented by processor 912, an interface 914, and a memory 916 that are communicatively connected to one another using conventional means. The well operations controller 920 can also include one or more interface, one or more processors, and one or more memory. Either the HL 910, the well operations controller 920, or both can also include a screen to provide a visual representation of the rock properties, such as the reservoir models illustrated in FIGS. 4 and 5.

The processor 912 is configured to determine rock properties of a subterranean formation based on a seismic image of the subterranean formation and a synthetic image generated from the seismic image. The processor 912 can operate according to one or more algorithm corresponding to at least some of the steps of the methods or work flows disclosed in FIGS. 2, 3, 4, 5, and 7. The one or more algorithms can be encapsulated in software code or in hardware, for example, an application, code library, dynamic link library, module, function, RAM, ROM, and other software and hardware implementations. The software can be stored in a file, database, or other computing system storage mechanism, such as an edge computing system. The one or more algorithms can be represented as a series of operating instructions stored on the memory 916.

The processor 912 may be any data processing unit, such as a central processing unit, a graphics processing unit, and/or a hardware accelerator. It is understood that the number of processors and the configuration that can be used for the HL 910 is not limited as illustrated. For example, multiple processors can be used for the HL 910.

The interface 914 receives and transmits data for the HL 910. The interface 914 forwards the received data to the processor 912 or the memory 916. For example, the interface 914 receives seismic data and well log data. The seismic data and the well log data may be stored on the memory 916.

The interface 914 also transmits results of processing the seismic and well log data generated by the HL 910, the rock properties. The rock properties can be represented by an inverted reservoir model. The interface 914 transmits the results to the well operations controller 920 that can use the rock properties for execution of a well operation. The interface 914 may be implemented using conventional circuitry and/or logic.

The memory 916 can be a non-transitory memory that stores data, e.g., sensor measurements from a wellbore and seismic data, which is needed in determining the rock properties. The memory 916 also store a series of instructions that when executed, causes the processor 912 to perform the disclosed methodology. The memory 916 may be a conventional memory device such as flash memory, ROM, PROM, EPROM, EEPROM, DRAM, SRAM and etc. The well operations controller 920 represents one or more computing device used for performing, directing, or controlling a well operation.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

As noted in the Summary aspects disclosed herein include:

A. A method of determining rock properties of a subterranean formation including: In one example, the method includes: (1) obtaining seismic data from a subterranean formation using a seismic acquisition system, (2) generating one or more seismic images of the subterranean formation using the seismic data, (3) creating one or more synthetic images from the one or more seismic images, and (4) determining rock properties of the subterranean formation based on the one or more seismic images and the one or more synthetic images.

B. A computing system for estimating rock properties of a subterranean formation including: (1) an interface to receive seismic data from a subterranean formation and obtained by a seismic acquisition system, and (2) one or more processors to perform operations including generating one or more seismic images of the subterranean formation using the seismic data, creating one or more synthetic images from the one or more seismic images, and determining rock properties of the subterranean formation based on the one or more seismic images and the one or more synthetic images.

C. A computer program product having a series of operating instructions stored on a non-transitory computer-readable medium that directs one or more processors when executed thereby to perform operations to determine rock properties of a subterranean formation, the operations including: (1) generating one or more seismic images of the subterranean formation using seismic data, (2) creating one or more synthetic images from the one or more seismic images, and (3) determining rock properties of the subterranean formation based on the one or more seismic images and the one or more synthetic images.

Each of the aspects A, B, and C can have one or more of the following additional elements in combination. Element 1: wherein creating the one or more synthetic images includes updating perturbations of geometrical elements from the one or more seismic images by propagating beams of elastic waves between a synthetic acquisition system and geometrical elements from the one or more seismic images. Element 2: wherein the geometrical elements are identified from a dip field generated from the one or more seismic images. Element 3: wherein the geometrical elements are within the one or more seismic images and are defined by multiple distinct points. Element 4: wherein the geometrical elements are lines or planes and the lines are defined by two distinct points and the planes are defined by at least three distinct points. Element 5: wherein the synthetic acquisition system corresponds to at least a subset of the seismic acquisition system. Element 6: wherein creating the one or more synthetic images further includes representing reaction of the geometrical elements to the elastic waves using a geometrical element spread function. Element 7: wherein the geometrical element spread function quantifies distortion of geology represented by the one or more seismic images. Element 8: wherein determining the rock properties includes performing a seismic inversion process by tying the seismic data to well log data using the geometrical element spread function. Element 9: wherein the tying is performed in depth domain. Element 10: further comprising determining hydrocarbon distribution in the subterranean formation based on the rock properties and performing a well operation based on the hydrocarbon distribution. Element 11: wherein at least one of the one or more seismic images is proximate a wellbore that is in the subterranean formation. Element 12: wherein the rock properties include uncertainty estimates. Element 13: wherein the method further includes addressing the uncertainty estimates by applying an invertible neural network to analyze seismic data distribution in latent space. Element 14: wherein the seismic data is represented by graph. Element 15: wherein the creating one or more synthetic images from the one or more seismic images uses geoscience knowledge. Element 16: wherein the creating one or more synthetic images from the one or more seismic images includes using a learning operator. Element 17: wherein the creating one or more synthetic images includes a posterior sampling of properties of the one or more seismic images. Element 18: wherein the creating one or more synthetic images includes using the one or more seismic images that are at different incidence angles with respect to the one or more geometrical elements. Element 19: wherein determining the rock properties of the subterranean formation includes learning hydrocarbon distribution in the subterranean formation. Element 20: wherein learning the hydrocarbon distribution in the subterranean formation includes updating a knowledge learning system. Element 21: wherein the hydrocarbon distribution is used as the seismic data for generating the one or more seismic images of the subterranean formation in an iterative process. Element 22: wherein the creating one or more synthetic images includes a demigration and a migration process.

What is claimed is:

1. A method of determining rock properties of a subterranean formation, comprising:

obtaining seismic data from a subterranean formation using a seismic acquisition system;

generating one or more seismic images of the subterranean formation using the seismic data;

creating one or more synthetic images from the one or more seismic images by:

interpreting geometrical elements from the one or more seismic images, wherein the geometrical elements are synthetic models of lines or planes that correspond to geological elements within the subterranean formations that represent a change in rock properties, wherein the lines are defined by two distinct points and the planes are defined by at least three distinct points, propagating synthetic beams of elastic waves between a synthetic acquisition system and the interpreted geometrical elements, creating an image-based geometrical element spread function representing a response of the geometrical elements to the propagated synthetic elastic waves, wherein the geometrical element spread function provides an angle offset of the reaction and quantifies distortion of the geological elements represented by the one or more seismic images, and providing the one or more synthetic images that represent perturbations of the synthetic beams of elastic waves at the geometrical elements using the image-based geometrical element spread function;

determining rock properties of the subterranean formation based on the one or more seismic images and the one or more synthetic images; and drilling a well by adjusting a trajectory of the well according to the rock properties.

2. The method as recited in claim 1, wherein the geometrical elements are identified from a dip field generated from the one or more seismic images.

3. The method as recited in claim 1, wherein the propagating of the synthetic elastic waves updates perturbations of the geological elements from the one or more seismic images.

4. The method as recited in claim 1, wherein determining the rock properties includes performing a seismic inversion process by tying the seismic data to well log data using the geometrical element spread function.

5. The method as recited in claim 4, wherein the geometrical element spread function is used as a time-domain wavelet in depth domain convolution for the seismic inversion process.

6. The method as recited in claim 4, wherein the tying is performed in depth domain.

7. The method as recited in claim 1, wherein the geometrical element spread function determines an opening angle and a vertical resolution based on a seismic dipping reflector.

8. The method as recited in claim 1, wherein at least one of the one or more seismic images is proximate a wellbore that is in the subterranean formation.

9. The method as recited in claim 1, wherein the rock properties include uncertainty estimates.

10. The method as recited in claim 9, wherein the method further includes addressing the uncertainty estimates by applying an invertible neural network to analyze seismic data distribution in latent space.

11. The method as recited in claim 1, wherein the seismic data is represented by a graph.

12. The method as recited in claim 1, wherein the creating one or more synthetic images from the one or more seismic images uses geoscience knowledge.

13. The method as recited in claim 1, wherein the creating one or more synthetic images from the one or more seismic images includes using a learning operator.

14. The method as recited in claim 1, wherein the creating one or more synthetic images includes a posterior sampling of properties of the one or more seismic images.

15. The method as recited in claim 1, wherein the creating one or more synthetic images includes using the one or more seismic images that are at different incidence angles with respect to the geological elements from the one or more seismic images.

16. The method as recited in claim 1, wherein determining the rock properties of the subterranean formation includes learning hydrocarbon distribution in the subterranean formation.

17. The method as recited in claim 16, wherein learning the hydrocarbon distribution in the subterranean formation includes updating a knowledge learning system.

18. The method as recited in claim 16, wherein the hydrocarbon distribution is used as the seismic data for generating the one or more seismic images of the subterranean formation in an iterative process.

19. A computing system for estimating rock properties of a subterranean formation, comprising:

an interface configured to receive seismic data from a subterranean formation and obtained by a seismic acquisition system; and one or more processors configured to perform operations including:

generating one or more seismic images of the subterranean formation using the seismic data;

creating one or more synthetic images from the one or more seismic images by:

interpreting geometrical elements from the one or more seismic images, wherein the geometrical elements are synthetic models of lines or planes that correspond to geological elements within the subterranean formations that represent a change in rock properties, wherein the lines are defined by two distinct points and the planes are defined by at least three distinct points, propagating synthetic beams of elastic waves, creating an image-based geometrical element spread function representing a reaction of the geometrical elements to the propagating synthetic elastic waves, wherein the geometrical element spread function provides an angle offset of the reaction and quantifies distortion of the geological elements represented by the one or more seismic images, providing the one or more synthetic images that represent perturbations of the synthetic beams of elastic waves at the geometrical elements using the image-based geometrical element spread function;

determining rock properties of the subterranean formation based on the one or more seismic images and the one or more synthetic images; and adjusting a trajectory during drilling of a well according to the rock properties.

20. The computing system as recited in claim 19, wherein determining the rock properties includes performing, in depth domain, a seismic inversion process by tying the seismic data to well log data using the geometrical element spread function.

* * * * *